United States Patent [19]
Kijima et al.

[11] Patent Number: 5,611,959
[45] Date of Patent: Mar. 18, 1997

[54] ALUMINATE PHOSPHOR

[75] Inventors: Naoto Kijima; Yasuo Shimomura; Chisato Miura, all of Yokohama; Takayuki Hisamune, Odawara; Masakazu Nabu, Odawara; Koichi Toriumi, Odawara, all of Japan

[73] Assignees: Mitsubishi Chemical Corporation; Kasei Optonix, Ltd., both of Tokyo, Japan

[21] Appl. No.: 515,807

[22] Filed: Aug. 16, 1995

[30] Foreign Application Priority Data

Aug. 17, 1994 [JP] Japan .................................. 6-193141
Sep. 19, 1994 [JP] Japan .................................. 6-223021
Sep. 19, 1994 [JP] Japan .................................. 6-223022

[51] Int. Cl.$^6$ .................................................. C09K 11/64
[52] U.S. Cl. ........................... 252/301.4 R; 252/301.6 R
[58] Field of Search ................... 252/301.4 R, 301.6 R

[56] References Cited

U.S. PATENT DOCUMENTS

| | | | |
|---|---|---|---|
| 4,161,457 | 7/1979 | Takahashi et al. | 252/301.4 R |
| 4,216,408 | 8/1980 | Verstegen et al. | 252/301.4 R |
| 4,382,207 | 5/1983 | Verstegen et al. | 252/301.4 R |
| 4,441,049 | 4/1984 | Verstegen et al. | 252/301.4 R |
| 4,837,481 | 6/1989 | Verstegen et al. | 252/301.4 R |
| 4,847,533 | 7/1989 | Hoffman | 252/301.4 R |
| 5,424,006 | 6/1995 | Murayama et al. | 252/301.4 R |

FOREIGN PATENT DOCUMENTS

| | | |
|---|---|---|
| 0418902 | 3/1991 | European Pat. Off. . |
| 0529956 | 3/1993 | European Pat. Off. . |
| 2205737 | 5/1974 | France . |
| 2301920 | 9/1976 | France . |
| 3-106987 | 5/1991 | Japan . |
| 4-106188 | 4/1992 | Japan . |
| 6-17049 | 1/1994 | Japan . |

OTHER PUBLICATIONS

J. Electrochem. Soc.: Solid–State Science and Technology, vol. 121, No. 12, Dec. 1974, pp. 1627–1631, J.M.P.J. Verstegen, et al., "A New Generation of Deluxe Fluorescent Lamps, Combining an Efficacy of 80 Lumens/W or More with a Color Rendering Index of Approximately 85".

Z. Phys. Chemie, Leipzig, vol. 271, No. 6, 1990, pp. 1181–1190, Von G. Kuenzler, et al., "Zur Abhaengigkeit Der UV–Stabilitaet Von Aluminatleuchstoffen Von Der Aktivatorkonzentration".

Proceedings for the 180 meeting of Keikotai Dogakukai, 1980, pp. 19–25.

*Primary Examiner*—Melissa Bonner
*Attorney, Agent, or Firm*—Oblon, Spivak, McClelland, Maier & Neustadt, P.C.

[57] ABSTRACT

An aluminate phosphor comprising (a) at least one element selected from the group consisting of Ba, Sr and Ca, (b) Eu, (c) Mg and/or Zn, (d) optionally Mn and (e) Al, said aluminate phosphor comprising a crystalline inorganic compound which shows, in its powder X-ray diffraction pattern upon incidence of X-rays of CuK$\alpha_1$, no peak at Miller index 008 independent of a diffraction peak at Miller index 110.

18 Claims, 6 Drawing Sheets

ALUMINATE PHOSPHOR

The present invention relates to an aluminate phosphor activated by bivalent europium or coactivated by bivalent europium and bivalent manganese. This phosphor is particularly suitable for a tri-color fluorescent lamp.

In recent years, a tri-color fluorescent lamp has been developed and practically used in the field of common fluorescent lamps for illumination. The phosphor to be used for this lamp is the one obtained by mixing three types of blue, green and red-emitting phosphors having relatively narrow band emission spectrum distributions in a proper ratio, to realize high luminous efficiency and high color rendering. Recently, a tri-color fluorescent lamp wherein a bluish green phosphor or a deep red phosphor is incorporated in addition to such three types of phosphors, has also been practically used.

This tri-color fluorescent lamp is known to undergo a color shift phenomenon if the change in luminous color and the decrease in the optical output during lighting up the lamp are substantial with respect to the respective phosphors, and the optical output and the luminous color become unbalanced among the phosphors.

The aluminate phosphor activated by bivalent europium or coactivated by bivalent europium and manganese, shows high luminous efficiency under excitation with ultraviolet rays (see Japanese Examined Patent Publication No. 22836/1977), and it has often been employed as a blue- or bluish green-emitting phosphor for a tri-color fluorescent lamp (JOURNAL OF ELECTROCHEMICAL SOCIETY, 121 (1974) 1627–1631).

However, this phosphor has had drawbacks that the decrease in the optical output is substantial, and when it is used as a blue color component for a tri-color fluorescent lamp, the fluorescent lamp tends to have substantial color shift as mentioned above. To overcome such a problem, it has been proposed to limit the composition of the aluminate phosphor to a very narrow range (Japanese Unexamined Patent Publication No. 106987/1991) or to incorporate a very small amount of manganese (Japanese Unexamined Patent Publication No. 106988/1991). However, further improvement is still desired.

Further, to increase the amount of incorporated Eu (Proceedings for the 180 meeting of Keikotai Dogakukai (1980) 19–25, Z. Phys. Chem. 271 (1990) 1181–1190) is also one method for overcoming the drawback. However, if the conditions for reduction firing are not proper, impurities such as $EuAlO_3$ tend to precipitate, whereby the effect of the above method on overcoming the color shift has been little in spite of the fact that expensive Eu is need to be used in a large amount.

It is also known that for the production of a fluorescent lamp, baking treatment at a temperature of from 400° to 800° C. is carried out at least once, and during this baking treatment, the phosphor tends to deteriorate, whereby the luminous efficiency (or luminous intensity) of the lamp will deteriorate. Especially, the aluminate phosphor activated by bivalent europium or coactivated by bivalent europium and manganese, has a drawback that the decrease in the luminous intensity by baking treatment during the production of a lamp, is substantial. If this problem can be solved, it is expected that the luminous efficiency of a tri-color fluorescent lamp can be further improved.

The present inventors have found that as a method for solving the above-mentioned problem of color shift, it is effective to specify the crystal structure of the aluminate phosphor activated by bivalent europium or coactivated by bivalent europium and bivalent manganese. As a method for obtaining this specified crystal structure, a method of increasing the concentration of europium may be mentioned. However, if the concentration of europium is increased, there has been a problem that the decrease in the luminous intensity by baking treatment tends to be substantial.

Further, Japanese Unexamined Patent Publication No. 17049/1994 discloses that a phosphor of the formula $(M_{1-x-y}Eu_xMn_y)O.aAl_2O_3.bRE$ wherein M is at least one element selected from the group consisting of Mg, Ca, Sr and Ba, and RE is at least one element selected from the group consisting of Sm and Yb, is an aluminate phosphor having the color shift problem solved, and the one wherein b is at least 0.1, is particularly effective. However, by a duplication test conducted by the present inventors, it has been confirmed that when b is at least 0.1, impurities other than the aluminate phosphor will appear, and no pure phosphor can be obtained.

In an attempt to solve the color shift phenomenon, the present inventors have studied in detail an aluminate phosphor activated by bivalent europium or coactivated by bivalent europium and bivalent manganese, and as a result, have found that a certain specific aluminate phosphor undergoes a less deterioration in the luminous intensity during lighting of the fluorescent lamp. The present invention has been accomplished by this discovery.

Further, the present inventors have found that the deterioration during baking treatment can be reduced by an addition of In, Sm, Tm or Yb to the aluminate phosphor activated by bivalent europium or coactivated by bivalent europium and bivalent manganese, and the present invention has been accomplished on the basis of this discovery.

Accordingly, it is an object of the present invention to provide an aluminate phosphor activated by bivalent europium or coactivated by bivalent europium and bivalent manganese, whereby the decrease in the luminous intensity is little during lighting of the fluorescent lamp.

Further, it is an object of the present invention to provide an aluminate phosphor activated by bivalent europium or coactivated by bivalent europium and bivalent manganese, whereby the decrease in the luminous intensity is little during the baking treatment.

In a first aspect of the present invention, there is provided an aluminate phosphor comprising (a) at least one element selected from the group consisting of Ba, Sr and Ca, (b) Eu, (c) Mg and/or Zn, (d) optionally Mn and (e) Al, said aluminate phosphor comprising a crystalline inorganic compound which shows, in its powder X-ray diffraction pattern upon incidence of X-rays of $CuK\alpha_1$, no peak at Miller index 008 independent of a diffraction peak at Miller index 110.

In a second aspect of the present invention, there is provided an aluminate phosphor comprising (a) at least one element selected from the group consisting of Ba, Sr and Ca, (b) Eu, (c) In, (d) Mg and/or Zn, (e) Al, and (f) optionally Mn.

In a third aspect of the present invention, there is provided an aluminate phosphor comprising (a) at least one element selected from the group consisting of Ba, Sr and Ca, (b) Eu, (c) at least one element selected from the group consisting of Sm, Tm and Yb, (d) Mg and/or Zn, (e) Al, and (f) optionally Mn.

BRIEF DESCRIPTION OF PREFERRED EMBODIMENTS

In the accompanying drawings.

Now, the present invention will be described in detail with reference to the preferred embodiments.

The aluminate phosphor according to the first aspect of the present invention is an aluminate phosphor comprising (a) at least one element selected from the group consisting of Ba, Sr and Ca, (b) Eu, (c) Mg and/or Zn, (d) optionally Mn and (e) Al, said aluminate phosphor comprising a crystalline inorganic compound which shows, in its powder X-ray diffraction pattern upon incidence of X-rays of $CuK\alpha_1$, no peak at Miller index 008 independent of a diffraction peak at Miller index 110. It is particularly preferred that said crystalline inorganic compound is represented by the formula:

$(M^1_{1-x}Eu_x)O \cdot a(M^2_{1-y}Mn_y)O \cdot (5.5-0.5a)Al_2O_3$ wherein $M^1$ is at least one element selected from the group consisting of Ba, Sr and Ca, $M^2$ is Mg and/or Zn, a is a real number of $0<a\leq2$, and x and y are real numbers of $0<x<1$ and $0\leq y<1$, respectively.

In the above formula, preferred values for x and y are determined for the following reasons. From the crystalline structure, x is variable from 0 to 1. However, to obtain adequate luminous intensity and to effectively prevent the deterioration in the luminous intensity during lighting of the fluorescent lamp, it is preferably from 0.1 to 0.5. The luminous intensity tends to be low, if x is less than 0.1 or more than 0.5. Further, when x is less than 0.15, the effect for preventing the deterioration of luminous intensity is small, but in the case of $0.1\leq x\leq0.15$, it is preferred that ratios of elements constituting $M^1$ in the above formula satisfy $0.2\leq Sr/(Ba+Sr+Ca+Eu)<1$, since such is effective to prevent the deterioration in luminous intensity during lighting of the fluorescent lamp. The larger the value of x, more effective for the prevention of the deterioration in luminous intensity. However, if it exceeds 0.5, precipitation of $EuAlO_3$ tends to be remarkable, and the deterioration-preventing effect will be saturated. From the crystal structure, y is also variable from 0 to 1. However, to obtain adequate luminous intensity, y is preferably at most 0.2, and y may be 0. Further, $M^1$ is at least one element selected from the group consisting of Ba, Sr and Ca. However, with a chemical composition wherein the constituting ratio of Ca is within a range of $0\leq Ca/(Ba+Sr+Ca+Eu)\leq0.17$, it is possible to reduce the temperature for preparation of the phosphor without formation of impurities. On the other hand, with a chemical composition wherein the constituting ratio of Ca is within a range of $0.17<Ca/(Ba+Sr+Ca+Eu)$, inclusion of impurities which are non-fluorescent substances, tends to be remarkable, and the luminous intensity tends to be low.

The space group of the crystalline inorganic compound contained in the phosphor of the present invention is usually $P6_3/mmc$. Determination of the space group is carried out by an electron diffraction method, an X-ray diffraction method or a neutron diffraction method.

In order to obtain a phosphor having a good color hue, the lattice constant a of the crystalline inorganic compound contained therein is required to be a value satisfying $5.62<a<5.65$ Å, and the lattice constant c is required to be a value satisfying $22.50<c<22.65$ Å. Within this range, the smaller the lattice constant c, the less the decrease in luminous intensity during lighting the fluorescent lamp. The lattice constant c can be made small by reducing the amount of Ba having a large ion radius and increasing the amount of incorporation of Eu and Sr having small ion radii.

Atomic positions of elements constituting the crystalline inorganic compound contained in the phosphor of the present invention can be determined by a Rietveld analysis on the basis of the powder X-ray diffraction pattern. According to this method, such elements are analyzed to occupy the atomic coordinate positions as shown in Table 1 or 2. Eu occupies the same position as an alkaline earth metal $M^1$. On the other hand, Mn occupies the same position as $M^2$. If instead of Ba having a large ion radius, Eu and Sr having small ion radii are substituted at positions for an alkaline earth metal $M^1$, void spaces at these positions become small, whereby the deterioration-preventing effect increases. Two types of positions are conceivable for the positions occupied by $M^2$ and Mn. However, when they occupy seats 4f, a takes a value within a range of $1\leq a\leq2$, and when they occupy seats 2a, a will be 1. When a<1, green color-emission of Eu becomes remarkable whereby it tends to be difficult to obtain a blue color or a bluish green color having a good color purity. Determination of the lattice constants and the atomic positions can be carried out by the above-mentioned various diffraction methods.

Figure 1:
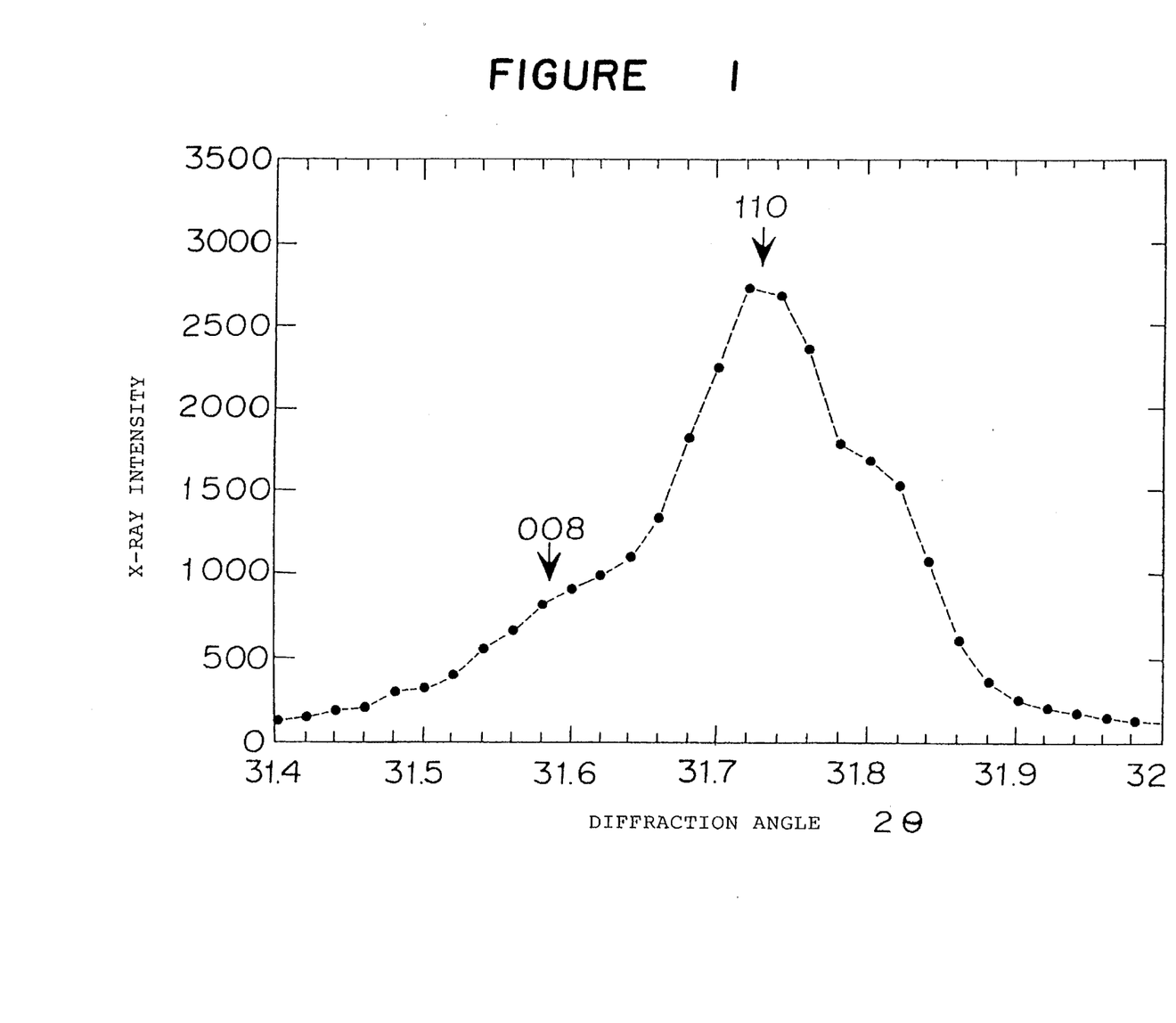
FIG. 1 shows the powder X-ray diffraction pattern in Example 1.

The powder X-ray diffraction pattern obtained from a crystalline inorganic compound having such a crystal structure is, for example, as shown in FIG. 1 in the case of a composition of $(Ba_{0.8}Eu_{0.2})O \cdot MgO \cdot 5Al_2O_3$. However, in a case where transparent impurities which present no substantial adverse effects to emission, such as $Al_2O_3$ or $MgAl_2O_4$, are included in the phosphor, the powder X-ray diffraction pattern will be a pattern showing diffraction peaks of such impurities in addition to the diffraction peak shown in FIG. 1.

Figure 2:
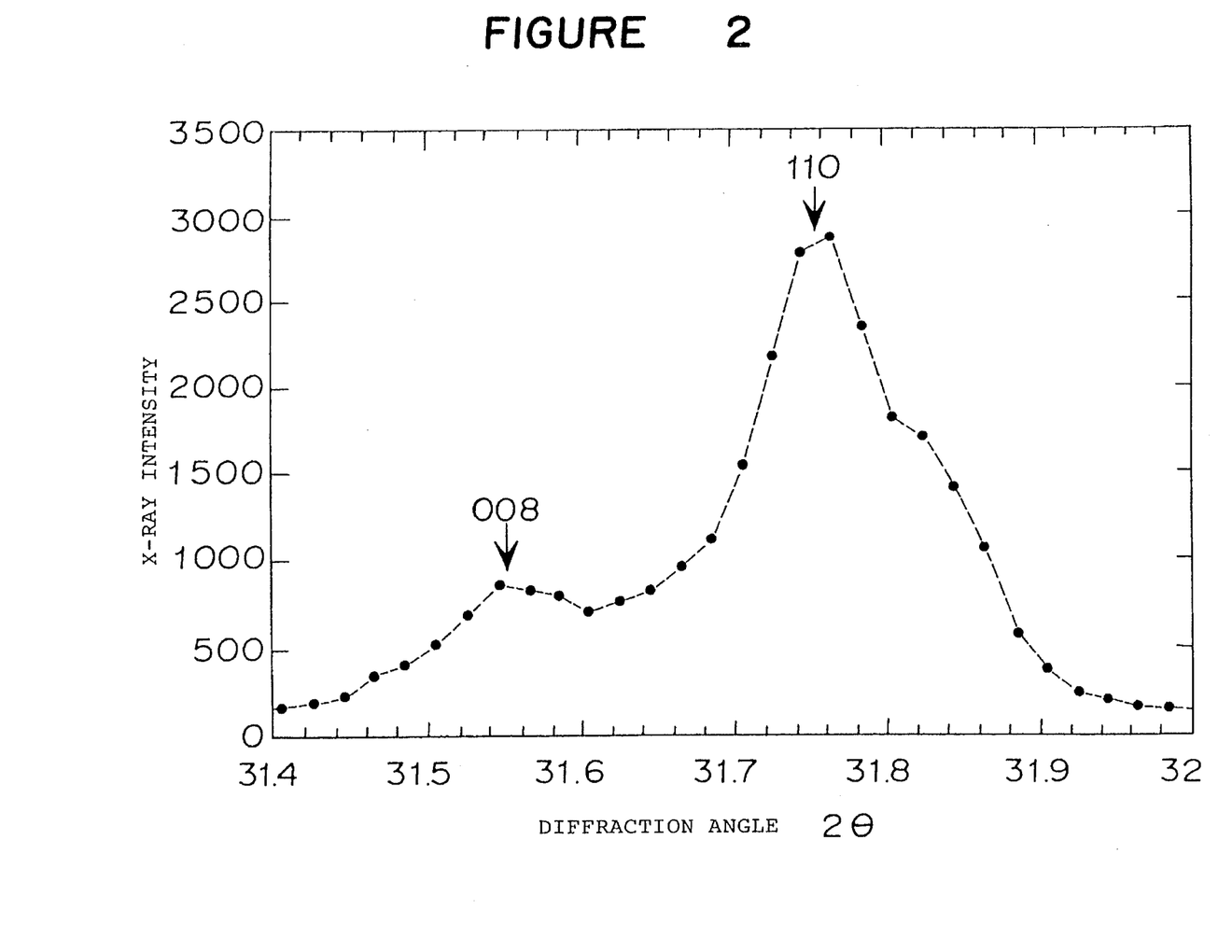
FIG. 2 shows the powder X-ray diffraction pattern in Comparative Example 1.

The crystalline inorganic compound contained in the phosphor of the present invention, which scarcely undergoes deterioration during lighting of the fluorescent lamp, shows a powder X-ray diffraction pattern upon incidence of X-rays of $CuK\alpha_1$ generated from a copper cathode X-ray tube, wherein as shown in FIG. 1, the diffraction peak at Miller index 008 has no maximum value (peak) independent of the diffraction peak at Miller index 110. On the other hand, when the pattern has an independent maximum value at Miller index 008, it will be a powder X-ray diffraction pattern as shown in FIG. 2. Here, "the pattern has no independent maximum value" means that when the X-ray diffraction intensity is represented by I and the diffraction angle 2θ is t degree, the primary differential value dI/dt has no negative value between the diffraction peak at Miller index 008 and the diffraction peak at Miller index 110. In order to prevent deterioration of the crystalline inorganic compound during lighting of the fluorescent lamp, it is necessary to stabilize the position of oxygen in the vicinity of Eu in this crystal. For this purpose, it is necessary to reduce the lattice constant c to a value satisfying 22.50<c<22.65 Å. To reduce the lattice constant c means to let the diffraction peak at Miller index 008 be present on a higher angle side, which leads to stabilization of the oxygen position in the vicinity of Eu. On the other hand, the position of the diffraction peak at Miller index 110 has no interrelation with the reduction of the lattice constant c. Accordingly, "the primary differential value dI/dt has no negative value between the diffraction peak at Miller index 008 and the diffraction peak at Miller index 110" qualitatively means that the lattice constant c is small, and the decrease in luminous intensity during lighting of the fluorescent lamp is small.

The phosphor of the present invention can be prepared as follows.

As raw materials for the phosphor, (1) a barium compound such as barium oxide, barium hydroxide or barium carbonate, (2) a strontium compound such as strontium oxide, strontium hydroxide or strontium carbonate, (3) a calcium compound such as calcium oxide, calcium hydroxide or calcium carbonate, (4) a europium compound such as europium oxide or europium fluoride, (5) a magnesium compound such as magnesium oxide, magnesium hydroxide or magnesium carbonate, (6) a zinc compound such as zinc oxide, zinc hydroxide or zinc carbonate, (7) a manganese compound such as manganese oxide, manganese hydroxide or manganese carbonate, and (8) an aluminum compound such as aluminum oxide or aluminum hydroxide, are weighed in predetermined amounts, and a flux such as barium fluoride, aluminum fluoride or magnesium fluoride is incorporated thereto. The raw material mixture is thoroughly mixed. The obtained mixture is filled in a crucible and fired at least once in a reducing atmosphere at a temperature of 1200° to 1700° C. over a period of from 2 to 40 hours. The higher the firing temperature, the higher the luminous intensity of the resulting phosphor. However, if the temperature exceeds 1700° C., the firing cost outweighs the effect for improvement of the luminous intensity. As a method for obtaining the reducing atmosphere, there is a method of firing in the presence of a reducing substance. For example, there may be mentioned a method in which the crucible filled with the raw material mixture, is embedded in a crucible filled with carbon, or a method wherein a carbon material such as graphite blocks or coconut shell powder is put into the crucible filled with the raw material mixture. To ensure the reduction, such a crucible may be fired in an atmosphere of nitrogen or nitrogen/hydrogen. Further, such an atmosphere may further contain steam. To optimize the conditions for reduction firing is very important to prepare the phosphor of the present invention. Namely, it is possible to produce the phosphor of the present invention by strongly reducing the raw material mixture with a reducing substance such as carbon or carbon monoxide in the entire stage of from the initiation to the end of firing. The fired product is subjected to dispersion, washing with water, drying and sieving to obtain a blue- or bluish green-emitting aluminate phosphor of the present invention.

According to the present invention, it is possible to obtain an aluminate phosphor having a luminous intensity-maintaining ratio of at least 92%, preferably at least 94%, in the X-ray irradiation test. With conventional aluminate phosphors, the luminous intensity-maintaining ratio was only at a level of 90% at best in the X-ray irradiation test. Thus, the phosphor of the present invention has a very high luminous intensity-maintaining ratio. A particularly high luminous intensity-maintaining ratio can be attained when the crystalline inorganic compound in the aluminate phosphor is represented by the formula:

$$(M^1{}_{1-x}Eu_x)O \cdot a(M^2{}_{1-y},Mn_y)O \cdot (5.5-0.5a)Al_2O_3$$

wherein $M^1$ is at least one element selected from the group consisting of Ba, Sr and Ca, $M^2$ is Mg and/or Zn, a is a real number of $1 \leq a \leq 2$, and x and y are real numbers of $0.1 \leq x \leq 0.5$ and $0 \leq y \leq 0.2$, respectively, and when x is $0.1 \leq x \leq 0.15$, the ratio of elements constituting $M^1$ in the formula satisfy $0.2 \leq Sr/(Ba+Sr+Ca+Eu)<1$.

It is preferable that the aluminate phosphor consists essentially of a single phase of the above crystalline inorganic compound.

The X-ray irradiation test is carried out in such a manner that by means of a powder X-ray diffraction meter having a copper cathode tube as the X-ray generating source, white X-rays generated upon application of an electric current of 30 mA at an accelerating voltage of 40 kV, are irradiated for six hours on a test specimen apart in a distance of 18.5 cm from the copper cathode, whereupon the luminous intensity under excitation with ultraviolet rays having a wavelength of 253.7 nm, is measured and calculated as a maintaining ratio to the luminous intensity prior to the irradiation. Namely, when the luminous intensity under excitation with ultraviolet rays prior to the X-ray irradiation is represented by $I_i$ and the luminous intensity after the X-ray irradiation is represented by $I_f$, the luminous intensity-maintaining ratio Mx after the X-ray irradiation will be $Mx=100 \times I_f/I_i$%. This X-ray irradiation test is very well interrelated with the luminous intensity-maintaining ratio during lightening of the fluorescent lamp.

Figure 3:
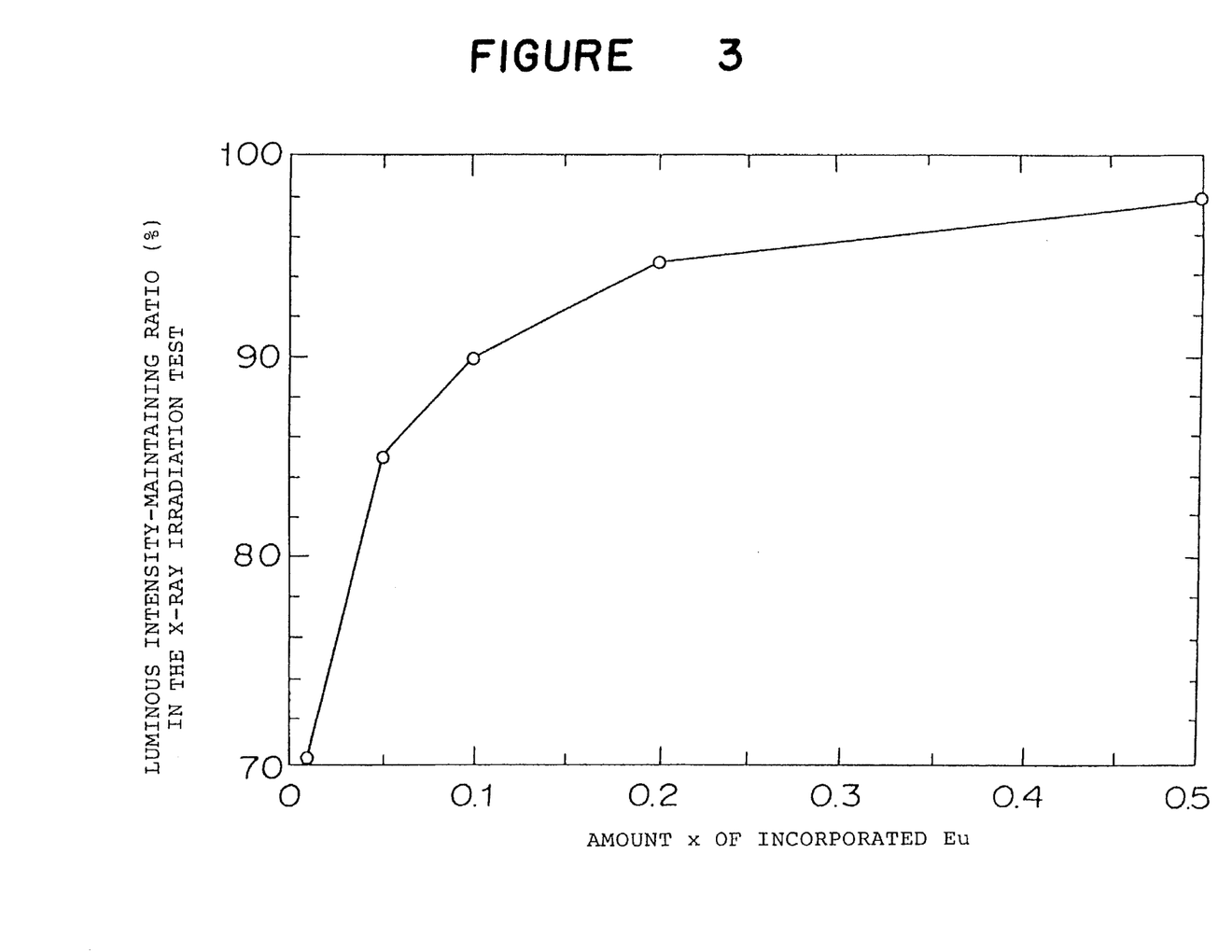
FIG. 3 shows the luminous intensity-maintaining ratio of the phosphor prepared with a formulation of $(Ba_{1-x}, Eu_x)O \cdot MgO \cdot 5Al_2O_3$ in the X-ray irradiation test ($0<x\leq0.5$).

FIG. 3 shows the luminous intensity-maintaining ratio Mx in the X-ray irradiation test of a phosphor prepared with a formulation of $(Ba_{1-x}Eu_x)O \cdot MgO \cdot 5Al_2O_3$ wherein $0<x \leq 0.5$.

Figure 4:
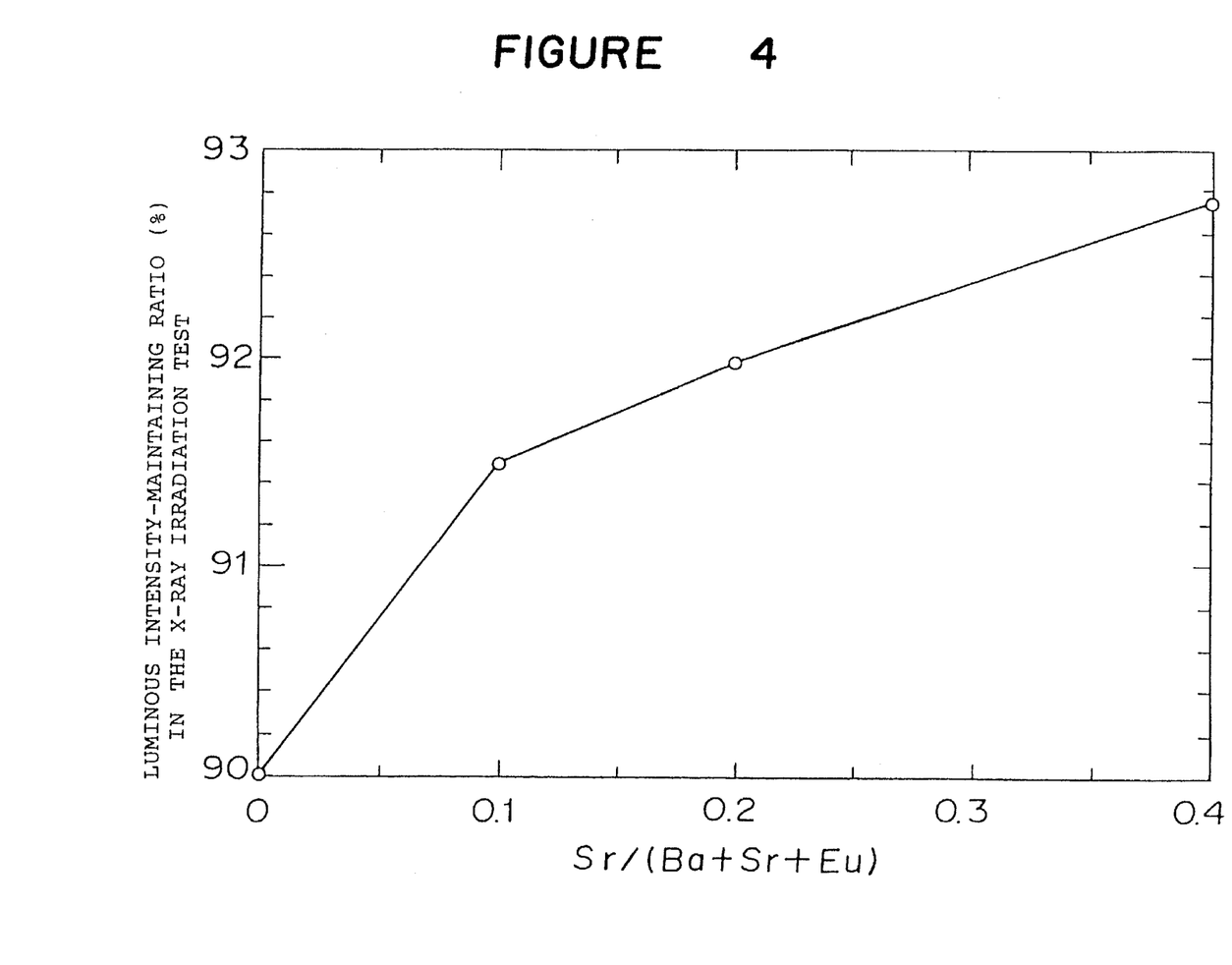
FIG. 4 shows the luminous intensity-maintaining ratio of the phosphor prepared with a formulation of $(Ba_{0.9-z}, Sr_zEu_{0.1})O \cdot MgO \cdot 5Al_2O_3$ in the X-ray irradiation test ($0<z\leq0.4$).

FIG. 4 shows the luminous intensity-maintaining ratio Mx in the X-ray irradiation test of a phosphor prepared with a formulation of $(Ba_{0.9-z}Sr_zEu_{0.1})O \cdot MgO \cdot 5Al_2O_3$, wherein $0 \leq z \leq 0.4$.

The phosphor according to the second aspect of the present invention is not particularly limited so long as it is an aluminate phosphor comprising (a) at least one element selected from the group consisting of Ba, Sr and Ca, (b) Eu, (c) In, (d) Mg and/or Zn, (e) Al, and (f) optionally Mn. However, it is preferably the one represented by the formula:

$$a'(M^{'1}{}_{1-x'}Eu_{x'})O \cdot b'(M^{'2}{}_{1-y'},Mn_{y'})O \cdot c'Al_2O_3 \cdot d'T$$

wherein $M^{'1}$ is at least one element selected from the group consisting of Ba, Sr and Ca, $M^{'2}$ is Mg and/or Zn, T is at least one indium compound selected from the group consisting of ½ $In_2O$, InO and ½ $In_2O_3$, and a', b', c', d', x' and y' are real numbers of $0.9 \leq a' \leq 1$, $0.9 \leq b' \leq 2$, $4.5 \leq c' \leq 5.1$, $d'>0$, $0<x'<1$ and $0 \leq y'<1$, respectively. In the above formula, a', b' and c' are usually considered to be 1, 1 and 5, respectively. However, depending upon the site where $M^2$ enters in the crystal or the manner of entering of In into the crystal, they are considered to be variable within the ranges of $0.9 \leq a' \leq 1$, $0.9 \leq b' \leq 2$, and $4.5 \leq c' \leq 5.1$, respectively. The In amount d' may be d'>0, but is preferably $0<d'<0.1$, since the effect of the present invention is observed in an amount of less than 0.1, and it is difficult to incorporate it in an amount of 0.1 or more. From the crystal structure, x' is variable from 0 to 1, but in order to obtain adequate luminous intensity, it is preferably from 0.05 to 0.5. From the crystal structure, y' is also variable from 0 to 1, but to obtain adequate luminous intensity, it is preferably at most 0.2. Even when the formulation of raw materials for the phosphor is outside the above specified ranges, it is possible to obtain a mixture of the phosphor of the present invention with impurities such as $Al_2O_3$, $MgAl_2O_4$ and $EuAlO_3$. This falls within the scope of the present invention.

The above-mentioned Japanese Examined Patent Publication No. 22836/1977 discloses an indium-activated barium magnesium aluminate phosphor having a peak wavelength of 402 nm, but discloses nothing about the aluminate phosphor comprising indium and europium, which has realized for the first time by the present invention. Further, with the phosphor of the present invention, no substantial emission by In is observed under excitation with ultraviolet rays.

Figure 5:
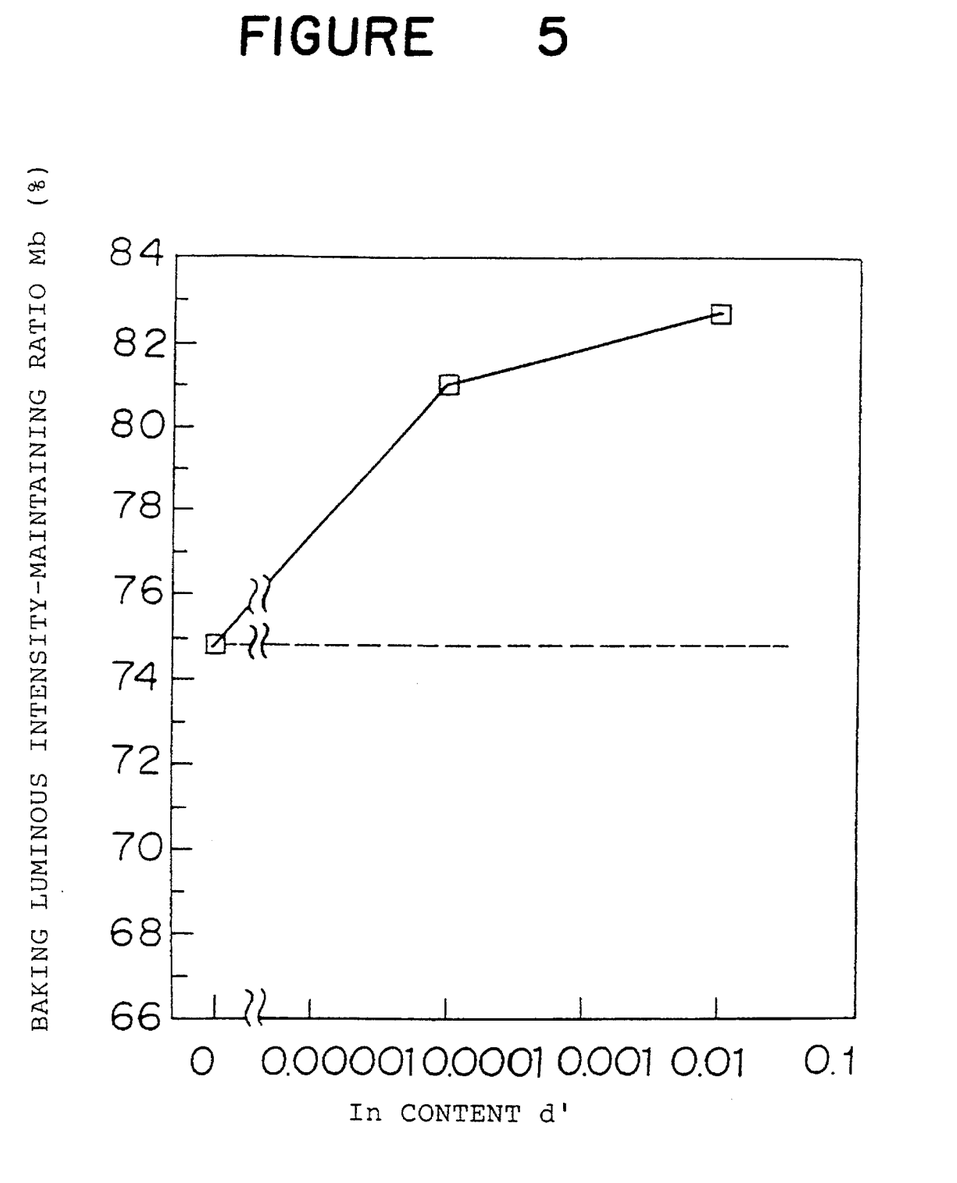
FIG. 5 illustrates a relation between the indium content d' in the phosphor of the present invention and the baking luminous intensity-maintaining ratio Mb.

FIG. 5 shows the baking luminous intensity-maintaining ratio Mb of a phosphor prepared with a formulation of $(Ba_{0.8}Eu_{0.2})O.MgO.5Al_2O_3.d'T$ wherein T is at least one member selected from the group consisting of ½ $In_2O$, InO and ½ $In_2O_3$. During the production with d'=0.1, indium metal precipitates, whereby the baking luminous intensity-maintaining ratio Mb tends to be low.

The phosphor of the present invention can be prepared as follows.

As raw materials for the phosphor, (1) a barium compound such as barium oxide, barium hydroxide or barium carbonate, (2) a strontium compound such as strontium oxide, strontium hydroxide or strontium carbonate, (3) a calcium compound such as calcium oxide, calcium hydroxide or calcium carbonate, (4) a europium compound such as europium oxide or europium fluoride, (5) an indium compound such as indium oxide, indium nitrate, indium fluoride, indium hydroxide or indium fluoride, (6) a magnesium compound such as magnesium oxide, magnesium hydroxide or magnesium carbonate, (7) a zinc compound such as zinc oxide, zinc hydroxide or zinc carbonate, (8) a manganese compound such as manganese oxide, manganese hydroxide or manganese carbonate, and (9) an aluminum compound such as aluminum oxide or aluminum hydroxide, are weighed in predetermined amounts, and a flux such as barium fluoride, aluminum fluoride or magnesium fluoride is incorporated thereto. The raw material mixture is thoroughly mixed. The obtained mixture is filled in a crucible and fired at least once preferably in a reducing atmosphere at a temperature of from 1200° to 1700° C. over a period of from 2 to 40 hours. As a method for obtaining the reducing atmosphere, there may be mentioned a method wherein the crucible filled with the raw material mixture, is embedded in a crucible filled with carbon, or a method wherein a carbon material such as graphite blocks or coconut shell powder is put into the crucible filled with the staring material mixture. To ensure the reduction, such a crucible may be fired in an atmosphere of nitrogen or nitrogen/hydrogen. Further, such an atmosphere may contain steam. The fired product is then subjected to dispersion, washing with water, drying and sieving to obtain a blue- or bluish green-emitting aluminate phosphor of the present invention.

It is assumed that bivalent europium is oxidized by baking in air to trivalent europium to form $EuAlO_3$, whereby luminous intensity decreases. It is also assumed that incorporated In is present in monovalent or bivalent form between spinel blocks in the crystal of the aluminate phosphor and will be oxidized instead of europium during the baking, whereby the decrease of luminum intensity is prevented.

The phosphor according to the third aspect of the present invention is not particularly limited so long as it is an aluminate phosphor comprising (a) at least one element selected from the group consisting of Ba, Sr and Ca, (b) Eu, (c) at least one element selected from the group consisting of Sm, Tm and Yb, (d) Mg and/or Zn, (e) Al, and (f) optionally Mn. However, it is preferably an aluminate phosphor of the formula:

wherein $M''^1$ is at least one element selected from the group consisting of Ba, Sr and Ca, $M''^2$ is Mg and/or Zn, Ln is at least one element selected from the group consisting of Sm, Tm and Yb, and a", b", x", y" and z" are real numbers of $1 \leq a'' \leq 2$, $4.5 \leq b'' \leq 5$, $0 < x'' < 1$, $0 < y'' < 1$ and $0 \leq z'' < 1$, respectively, provided that $x''+y''<1$. In the above formula, a" is usually considered to be 1, but it is considered to be variable up to 2 depending upon the site where $M''^2$ enters in the crystal. Likewise, b" is usually considered to be 5, but it is considered to be variable from 4.5 to 5 along with the above change of a". From the crystal structure, x" is variable from 0 to 1, but in order to obtain adequate luminous intensity, it is preferably from 0.05 to 0.5. The Ln amount y" is preferably $0<y''<0.1$, since the effect of the present invention is observed in an amount of less than 0.1 and the initial luminous intensity tends to be low if the amount is 0.1 or more. From the crystal structure, z" is also variable from 0 to 1, but in order to obtain adequate luminous intensity, it is preferably at most 0.2. Ln is preferably Tm.

Even if the formulation of raw materials for the phosphor is outside the above specified ranges, a mixture of the phosphor of the present invention with impurities such as $Al_2O_3$, $MgAl_2O_4$ and $EuAlO_3$ may be obtained. This is also within the scope of the present invention.

Figure 6:
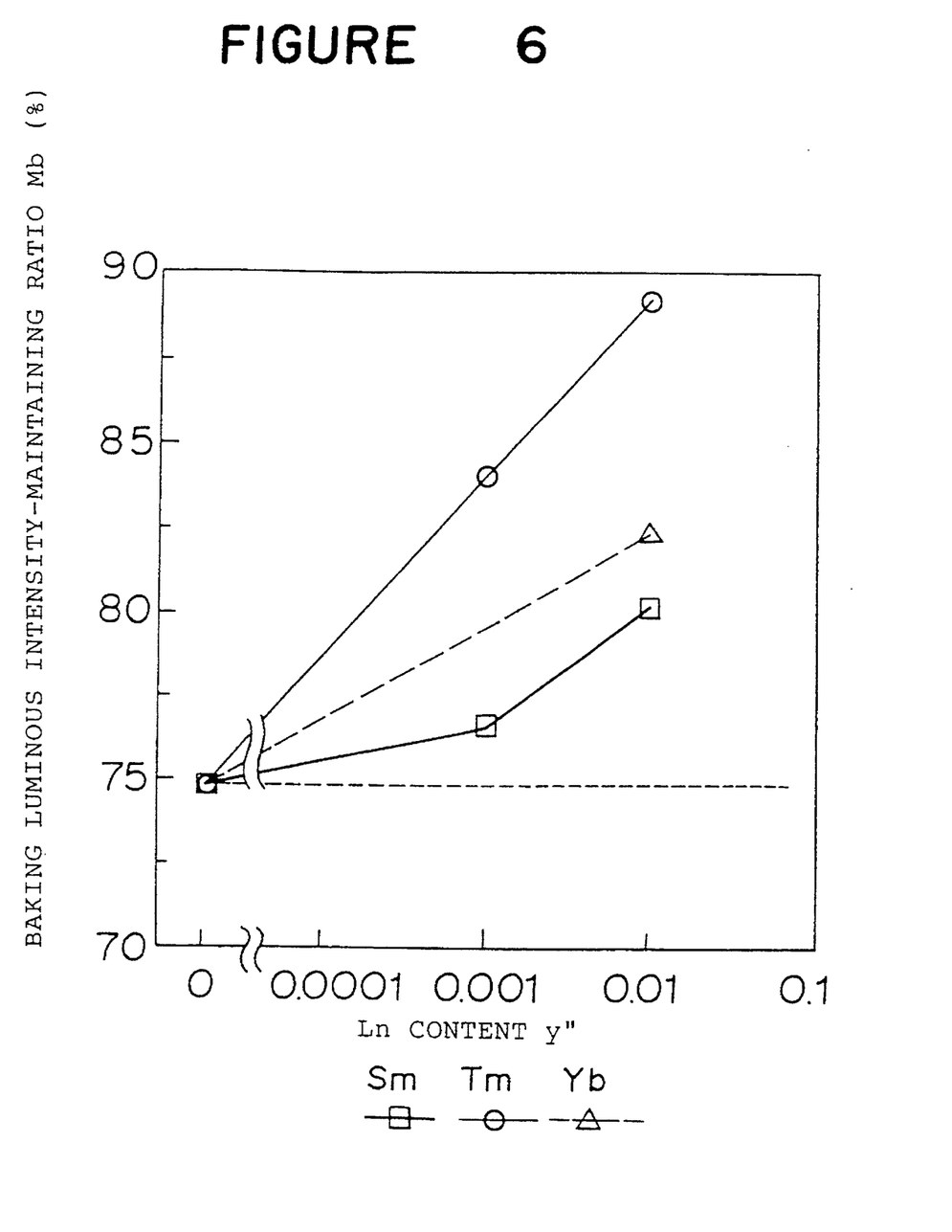
FIG. 6 illustrates a relation between the content y" of Ln (Ln is at least one member selected from the group consisting of Sm, Tm and Yb) in the phosphor of the present invention and the baking luminous intensity-maintaining ratio Mb.

FIG. 6 shows the baking luminous intensity-maintaining ratio Mb of a phosphor prepared with a formulation of $(Ba_{0.8-y''}Eu_{0.2}Ln_{y''})O.MgO.5Al_2O_3$, wherein Ln is Sm, Tm or Yb.

The phosphor according to this third aspect of the present invention can be prepared in the same manner as for the phosphor according to the second aspect of the present invention, by using (1) a barium compound such as barium oxide, barium hydroxide or barium carbonate, (2) a strontium compound such as strontium oxide, strontium hydroxide or strontium carbonate, (3) a calcium compound such as calcium oxide, calcium hydroxide or calcium carbonate, (4) a europium compound such as europium oxide or europium fluoride, (5) a samarium compound such as samarium oxide, samarium nitrate, samarium chloride, samarium carbonate or samarium fluoride, (6) a thulium compound such as thulium oxide, thulium nitrate, thulium chloride, thulium carbonate or thulium fluoride, (7) an ytterbium compound such as ytterbium oxide, ytterbium nitrate, ytterbium chloride, ytterbium carbonate or ytterbium fluoride, (8) a magnesium compound such as magnesium oxide, magnesium hydroxide or magnesium carbonate, (9) a zinc compound such as zinc oxide, zinc hydroxide or zinc carbonate, (10) a manganese compound such as manganese oxide, manganese hydroxide or manganese carbonate, and (11) an aluminum compound such as aluminum oxide or aluminum hydroxide, as the raw materials for the phosphor.

It is assumed that bivalent europium is oxidized by baking in air to trivalent europium to form $EuAlO_3$, whereby luminous intensity decreases. It is also assumed that incorporated Ln (Ln is at least one element selected from the group consisting of Sm, Tm and Yb) is present in a bivalent form between spinel blocks in the crystal of the aluminate phosphor and will be oxidized instead of europium during the baking, whereby the decrease of luminous intensity is prevented.

The phosphor according to the second or third aspect of the present invention preferably is a crystalline inorganic compound which shows, in its powder X-ray diffraction pattern upon incidence of X-rays of $CuK\alpha_1$, no peak at Miller index 008 independent of a diffraction peak at Miller index 110, like the crystalline inorganic compound contained in the phosphor according to the first aspect of the present invention.

As a method for evaluating the decrease of luminous intensity at the time of baking treatment during the production of the lamp, 5 g of the phosphor was put into a crucible and baked in air at 750° C. for 10 minutes, whereupon the luminous intensity-maintaining ratio was measured.

The luminance or brightness of the blue- or bluish green-emitting phosphor is substantially influenced by visual sensitivity and substantially varies depending upon the emitted color even when the luminous efficiency is the same. Therefore, as a convenient evaluation value for luminous intensity, a value Br/y is employed which is obtained by dividing brightness Br by the value y of the emitting color. Namely, when the brightness and the value y of the emitted color before baking are represented by $Br_i$ and $Y_i$, respectively, and those after baking are represented by $Br_b$ and $Y_b$, respectively, the baking luminous intensity-maintaining ratio Mb will be:

$$Mb=(Br_b/y_b)/(Br_i/y_i)\times 100\%$$

The baking luminous intensity-maintaining ratio Mb changes depending upon the concentration of the activating agent or the particle size. Therefore, the effects for the improvement should be evaluated by comparing at the same concentration of the activating agent and with respect to the materials prepared by using the same flux concentration and the same firing method.

By using the aluminate phosphor activated by bivalent europium or coactivated by bivalent europium and bivalent manganese according to the present invention, it is possible to produce a fluorescent lamp whereby the decrease in luminous intensity during lighting is small. Accordingly, it is possible to obtain a tri-color fluorescent lamp showing high luminance and high color rendering over a long period of time.

Further, according to the present invention, it is possible to obtain a blue- or bluish green-emitting phosphor whereby the decrease in luminous intensity by baking is little and to present a good fluorescent lamp free from a color shift phenomenon.

The phosphor of the present invention is applicable to a product whereby emission is obtainable under excitation with ultraviolet rays, and the applicability is not limited to a fluorescent lamp. For example, it may be employed, for example, to a plasma display or a rare gas discharge lamp.

Furthermore, the phosphor of the present invention is effective for a product which is subjected to baking in its production process, particularly useful for a fluorescent lamp and a plasma display.

Now, the present invention will be described in further detail with reference to Examples. However, it should be understood that the present invention is by no means restricted to such specific Examples.

EXAMPLE 1

$BaCO_3$: 0.8 mol $Eu_2O_3$: 0.1 mol

MgO: 1.0 mol $Al_2O_3$ (γ-type): 5.0 mol

The above raw materials were mixed in a wet system using ethanol, then dried and molded into pellets under a molding pressure of 1000 kgf/cm². The pellets were put into a crucible and covered with a lid. This crucible was put into a separate crucible containing carbon beads and covered with a lid, followed by firing in the atmospheric air at a maximum temperature of 1500° C. for 4 hours. Then, obtained fired pellets were pulverized to obtain a bivalent europium-activated blue-emitting barium magnesium aluminate phosphor of $(Ba_{0.8},Eu_{0.2})O\cdot MgO\cdot 5Al_2O_3$.

The luminous intensity-maintaining ratio Mx of this phosphor in the X-ray irradiation test was 94.8%. Further, the space group of this phosphor was $P6_3/mmc$, and the lattice constants were a=5.636 Å and c=22.643 Å, whereby the constituting elements occupied the atomic coordinate positions as shown in Table 1 or 2. The phosphor showed the powder X-ray diffraction pattern of FIG. 1 upon incidence of X-ray of $CuK\alpha_1$ and showed a pattern having no peak at Miller index 008 independent of the diffraction peak at Miller index 110. Further, Table 3 shows the relationship among the Miller indices, the diffraction angle 2θ and the spacing.

EXAMPLES 2 to 9

Aluminate phosphors were prepared in the same manner as in Example 1 except that the compositions of the raw material mixtures, the firing temperatures and addition or non-addition of $AlF_3$ as flux were changed as shown in Table 4. Luminous intensity-maintaining ratios Mx of these phosphors in the X-ray irradiation tests are shown in Table 5. Further, with respect to the main Examples, the lattice constants are also indicated. The space groups, the atomic coordinate positions of constituting elements and the powder X-ray diffraction patterns of these phosphors were substantially the same as those in Example 1, and they showed patterns having no peaks at Miller index 008 which are independent of the diffraction peaks at Miller index 110.

The preparation methods and the characteristics in Examples 1 to 9 are summarized in Tables 4 and 5.

EXAMPLE 10

$BaCO_3$: 0.8 mol $Eu_2O_3$: 0.1 mol $3MgCO_3\cdot Mg(OH)_2$: 0.25 mol $Al_2O_3$ (γ-type): 5.0 mol $AlF_3$: 0.012 mol The above raw materials were mixed in a dry system, followed by drying and sieving, and then filled in a crucible. Further, a crucible containing carbon beads was placed on the raw materials and covered with a lid, followed by primary firing in a nitrogen atmosphere containing steam at a maximum temperature of 1450° C. over a period of 11 hours inclusive of the temperature-raising time. Then, the fired powder was pulverized, sieved and again filled in a crucible. Further, a crucible containing carbon beads was placed thereon and covered with a lid, followed by secondary firing in a nitrogen/hydrogen mixed atmosphere containing steam at a maximum temperature of 1450° C. over a period of 11 hours inclusive of the temperature-raising time. Then, the fired powder was subjected to dispersion, washing, drying and sieving treatments to obtain a bivalent europium-activated blue-emitting barium magnesium aluminate phosphor of $(Ba_{0.8},Eu_{0.2})O\cdot MgO\cdot 5Al_2O_3$.

The luminous intensity-maintaining ratio Mx of this phosphor in the X-ray irradiation test was 94.8%. Further, the space group, the lattice constants, the atomic coordinate positions of constituting elements and the powder X-ray diffraction pattern were the same as those in Example 1.

EXAMPLE 11

$BaCO_3$: 0.85 mol $Eu_2O_3$: 0.075 mol $3MgCO_3 \cdot Mg(OH)_2$: 0.25 mol $Al_2O_3$ (γ-type): 5.0 mol $AlF_3$: 0.012 mol A barium magnesium aluminate phosphor was prepared in the same manner as in Example 10 except that the composition of the raw material mixture was changed as shown above. The luminous intensity-maintaining ratio Mx of this phosphor in the X-ray irradiation test was 93.1%. Further, the space group, the lattice constants, the atomic coordinate positions of constituting elements and the powder X-ray diffraction pattern of this phosphor were substantially the same as those in Example 1.

EXAMPLE 12

$BaCO_3$: 0.6 mol $SrCO_3$: 0.2 mol $Eu_2O_3$: 0.1 mol $3MgCO_3 \cdot Mg(OH)_2$: 0.25 mol $Al_2O_3$ (γ-type): 5.0 mol $AlF_3$: 0.03 mol A barium strontium magnesium aluminate phosphor was prepared in the same manner as in Example 10 except that the composition of the raw material mixture was changed as shown above. The luminous intensity-maintaining ratio Mx of this phosphor in the X-ray irradiation test was 95.1%. The space group, the lattice constants, the atomic coordinate positions of constituting elements and the powder X-ray diffraction pattern of this phosphor were substantially the same as those in Example 1.

COMPARATIVE EXAMPLE 1

$BaCO_3$: 0.99 mol $Eu_2O_3$: 0.005 mol

MgO: 1.0 mol $Al_2O_3$ (γ-type): 5.0 mol

A bivalent europium-activated blue-emitting barium magnesium aluminate phosphor of $(Ba_{0.99}, Eu_{0.01})O \cdot MgO \cdot 5Al_2O_3$ was prepared in the same manner as in Example 1 except that the composition of the raw material mixture was changed as shown above.

The luminous intensity-maintaining ratio Mx of this phosphor in the X-ray irradiation test was 70.4%. Further, the space group of this phosphor was $P6_3/mmc$ and the lattice constants were a=5.636 Å and c=22.686 Å. Upon incidence of X-rays of $CuK\alpha_1$, this phosphor showed a pattern having a diffraction peak at Miller index 008 independent of the peak at Miller index 110, as shown in FIG. 2.

COMPARATIVE EXAMPLES 2 to 6

Alkaline earth magnesium aluminate phosphors were prepared in the same manner as in Example 1 except that the compositions of the raw material mixtures, the firing temperatures and addition or non-addition of $AlF_3$ as flux were changed as shown in Table 4. The luminous intensity-maintaining ratios Mx of these phosphors in the X-ray irradiation tests are shown in Table 5. Further, with respect to main Comparative Examples, the lattice constants were also indicated. The powder X-ray diffraction patterns of these phosphors were substantially the same as the one in Comparative Example 1 and had independent diffraction peaks at Miller index 008.

The preparation methods and the characteristics in Comparative Examples 1 to 6 are summarized in Tables 4 and 5.

COMPARATIVE EXAMPLE 7

$BaCO_3$: 0.90 mol $Eu_2O_3$: 0.05 mol $3MgCO_3 \cdot Mg(OH)_2$: 0.25 mol $Al_2O_3$ (γ-type): 5.0 mol $AlF_3$: 0.012 mol A barium magnesium aluminate phosphor was prepared in the same manner as in Example 10 except that the composition of the raw material mixture was changed as shown above. The luminous intensity-maintaining ratio Mx of this phosphor in the X-ray irradiation test was 90.4%. The powder X-ray diffraction pattern of this phosphor was substantially the same as the one in Comparative Example 1 and had an independent diffraction peak at Miller index 008.

TABLE 1

| Atomic species | Seats | Coordinate axis x | Coordinate axis y | Coordinate axis z | Occupying ratio |
|---|---|---|---|---|---|
| M | 2d | 1/3 | 2/3 | 3/4 | 1-x |
| Eu | 2d | 1/3 | 2/3 | 3/4 | x |
| Al | 2a | 0 | 0 | 0 | 1 |
| Al | 4f | 1/3 | 2/3 | 0.0234 to 0.0250 | 1-0.5a |
| Mg | 4f | 1/3 | 2/3 | 0.0234 to 0.0250 | 0.5a(1-y) |
| Mn | 4f | 1/3 | 2/3 | 0.0234 to 0.0250 | 0.5ay |
| Al | 12k | 0.1607 to 0.1654 | 0.3290 to 0.3353 | −0.1054 to −0.1067 | 1 |
| Al | 4f | 1/3 | 2/3 | 0.1742 to 0.1759 | 1 |
| O | 4e | 0 | 0 | 0.1434 to 0.1472 | 1 |
| O | 4f | 1/3 | 2/3 | −0.0555 to −0.0593 | 1 |
| O | 2c | 1/3 | 2/3 | 1/4 | 1 |
| O | 12k | 0.1570 to 0.1485 | 0.2969 to 0.3065 | 0.0539 to 0.0519 | 1 |
| O | 12k | 0.5018 to 0.5099 | 0.0154 to 0.0045 | 0.1482 to 0.1508 | 1 |

TABLE 2

| Atomic species | Seats | Coordinate axis x | Coordinate axis y | Coordinate axis z | Occupying ratio |
|---|---|---|---|---|---|
| M | 2d | 1/3 | 2/3 | 3/4 | 1-x |
| Eu | 2d | 1/3 | 2/3 | 3/4 | x |
| Mg | 2a | 0 | 0 | 0 | 1-y |
| Mn | 2a | 0 | 0 | 0 | y |

TABLE 2-continued

| Atomic species | Seats | Coordinate axis x | Coordinate axis y | Coordinate axis z | Occupying ratio |
|---|---|---|---|---|---|
| Al | 4f | 1/3 | 2/3 | 0.0234 to 0.0250 | 1 |
| Al | 12k | 0.1607 to 0.1654 | 0.3290 to 0.3353 | −0.1054 to −0.1067 | 1 |
| Al | 4f | 1/3 | 2/3 | 0.1742 to 0.1759 | 1 |
| O | 4e | 0 | 0 | 0.1434 to 0.1472 | 1 |
| O | 4f | 1/3 | 2/3 | −0.0555 to 0.0593 | 1 |
| O | 2c | 1/3 | 2/3 | 1/4 | 1 |
| O | 12k | 0.1570 to 0.1485 | 0.2969 to 0.3065 | 0.0539 to 0.0519 | 1 |
| O | 12k | 0.5018 to 0.5099 | 0.0154 to 0.0045 | 0.1482 to 0.1508 | 1 |

TABLE 3

| Miller indices | | | Diffraction angle 2θ ±0.1 (degree) | Spacing (Å) |
|---|---|---|---|---|
| h | k | l | | |
| 0 | 0 | 2 | 7.8 | 11.32 |
| 0 | 0 | 4 | 15.6 | 5.66 |
| 1 | 0 | 0 | 18.2 | 4.88 |
| 1 | 0 | 1 | 18.6 | 4.77 |
| 1 | 0 | 2 | 19.8 | 4.48 |
| 1 | 0 | 3 | 21.7 | 4.10 |
| 0 | 0 | 6 | 23.6 | 3.77 |
| 1 | 0 | 4 | 24.1 | 3.70 |
| 1 | 0 | 5 | 26.8 | 3.32 |
| 1 | 0 | 6 | 29.9 | 2.99 |
| 0 | 0 | 8 | 31.6 | 2.83 |
| 1 | 1 | 0 | 31.7 | 2.82 |
| 1 | 1 | 2 | 32.7 | 2.73 |
| 1 | 0 | 7 | 33.2 | 2.70 |
| 1 | 1 | 4 | 35.6 | 2.52 |
| 1 | 0 | 8 | 36.7 | 2.45 |
| 2 | 0 | 0 | 36.8 | 2.44 |
| 2 | 0 | 1 | 37.0 | 2.43 |
| 2 | 0 | 2 | 37.7 | 2.39 |
| 2 | 0 | 3 | 38.7 | 2.32 |
| 0 | 0 | 10 | 39.8 | 2.26 |
| 1 | 1 | 6 | 39.9 | 2.26 |
| 2 | 0 | 4 | 40.2 | 2.24 |
| 1 | 0 | 9 | 40.3 | 2.24 |
| 2 | 0 | 5 | 42.0 | 2.15 |
| 1 | 0 | 10 | 44.1 | 2.05 |
| 2 | 0 | 6 | 44.2 | 2.05 |
| 1 | 1 | 8 | 45.4 | 2.00 |
| 2 | 0 | 7 | 46.6 | 1.95 |
| 1 | 0 | 11 | 47.9 | 1.90 |
| 0 | 0 | 12 | 48.2 | 1.89 |
| 2 | 0 | 8 | 49.3 | 1.85 |
| 2 | 1 | 0 | 49.4 | 1.84 |
| 2 | 1 | 1 | 49.5 | 1.84 |
| 2 | 1 | 2 | 50.1 | 1.82 |
| 2 | 1 | 3 | 50.9 | 1.79 |
| 1 | 1 | 10 | 51.7 | 1.77 |
| 1 | 0 | 12 | 51.9 | 1.76 |
| 2 | 1 | 4 | 52.1 | 1.75 |
| 2 | 0 | 9 | 52.2 | 1.75 |
| 2 | 1 | 5 | 53.6 | 1.71 |
| 2 | 0 | 10 | 55.3 | 1.66 |
| 2 | 1 | 6 | 55.4 | 1.66 |
| 1 | 0 | 13 | 56.0 | 1.64 |
| 3 | 0 | 0 | 56.5 | 1.63 |
| 3 | 0 | 1 | 56.7 | 1.62 |
| 0 | 0 | 14 | 59.9 | 1.62 |
| 3 | 0 | 2 | 57.1 | 1.61 |
| 2 | 1 | 7 | 57.5 | 1.60 |
| 3 | 0 | 3 | 57.9 | 1.59 |
| 2 | 0 | 11 | 58.6 | 1.57 |
| 1 | 1 | 12 | 58.9 | 1.57 |
| 3 | 0 | 4 | 59.0 | 1.56 |
| 2 | 1 | 8 | 59.8 | 1.55 |
| 1 | 0 | 14 | 60.2 | 1.54 |
| 3 | 0 | 5 | 60.4 | 1.53 |
| 3 | 0 | 6 | 62.1 | 1.49 |
| 2 | 0 | 12 | 62.1 | 1.49 |
| 2 | 1 | 9 | 62.4 | 1.49 |
| 3 | 0 | 7 | 64.0 | 1.45 |
| 1 | 0 | 15 | 64.6 | 1.44 |
| 2 | 1 | 10 | 65.2 | 1.43 |
| 2 | 0 | 13 | 65.8 | 1.42 |
| 0 | 0 | 16 | 66.0 | 1.42 |
| 3 | 0 | 8 | 66.2 | 1.41 |
| 2 | 2 | 0 | 66.3 | 1.41 |
| 1 | 1 | 14 | 66.6 | 1.40 |
| 2 | 2 | 2 | 66.9 | 1.40 |
| 2 | 1 | 11 | 68.2 | 1.37 |
| 2 | 2 | 4 | 68.6 | 1.37 |
| 3 | 0 | 9 | 68.6 | 1.37 |
| 1 | 0 | 16 | 69.0 | 1.36 |
| 3 | 1 | 0 | 69.4 | 1.35 |
| 3 | 1 | 1 | 69.5 | 1.35 |
| 2 | 0 | 14 | 69.7 | 1.35 |
| 3 | 1 | 2 | 69.9 | 1.34 |

TABLE 4

| | $BaCO_3$ mol | $SrCO_3$ mol | $Eu_2O_3$ mol | MgO mol | $Al_2O_3$ mol | $AlF_3$ mol | Composition | Firing temp. (°C.) |
|---|---|---|---|---|---|---|---|---|
| Example 1 | 0.8 | — | 0.1 | 1 | 5 | — | $(Ba_{0.8},Eu_{0.2})O \cdot MgO \cdot 5Al_2O_3$ | 1500 |
| Example 2 | 0.7 | — | 0.15 | 1 | 5 | — | $(Ba_{0.7},Eu_{0.3})O \cdot MgO \cdot 5Al_2O_3$ | 1500 |
| Example 3 | 0.5 | — | 0.25 | 1 | 5 | — | $(Ba_{0.5},Eu_{0.5})O \cdot MgO \cdot 5Al_2O_3$ | 1500 |
| Example 4 | 0.8 | — | 0.1 | 1 | 5 | — | $(Ba_{0.8},Eu_{0.2})O \cdot MgO \cdot 5Al_2O_3$ | 1650 |
| Example 5 | 0.5 | — | 0.25 | 1 | 5 | — | $(Ba_{0.5},Eu_{0.5})O \cdot MgO \cdot 5Al_2O_3$ | 1650 |
| Example 6 | 0.8 | — | 0.1 | 1 | 5 | 1 | $(Ba_{0.8},Eu_{0.2})O \cdot MgO \cdot 5Al_2O_3$ | 1650 |
| Example 7 | 0.5 | — | 0.25 | 1 | 5 | 1 | $(Ba_{0.5},Eu_{0.5})O \cdot MgO \cdot 5Al_2O_3$ | 1650 |
| Example 8 | 0.7 | 0.2 | 0.05 | 1 | 5 | 1 | $(Ba_{0.7},Sr_{0.2},Eu_{0.1})O \cdot MgO \cdot 5Al_2O_3$ | 1500 |

TABLE 4-continued

|  | BaCO$_3$ mol | SrCO$_3$ mol | Eu$_2$O$_3$ mol | MgO mol | Al$_2$O$_3$ mol | AlF$_3$ mol | Composition | Firing temp. (°C.) |
|---|---|---|---|---|---|---|---|---|
| Example 9 | 0.5 | 0.4 | 0.05 | 1 | 5 | 1 | (Ba$_{0.5}$,Sr$_{0.4}$,Eu$_{0.1}$)O.MgO.5Al$_2$O$_3$ | 1500 |
| Comparative Example 1 | 0.99 | — | 0.005 | 1 | 5 | — | (Ba$_{0.99}$,Eu$_{0.01}$)O.MgO.5Al$_2$O$_3$ | 1500 |
| Comparative Example 2 | 0.95 | — | 0.025 | 1 | 5 | — | (Ba$_{0.95}$,Eu$_{0.05}$)O.MgO.5Al$_2$O$_3$ | 1500 |
| Comparative Example 3 | 0.9 | — | 0.05 | 1 | 5 | — | (Ba$_{0.9}$,Eu$_{0.1}$)O.MgO.5Al$_2$O$_3$ | 1500 |
| Comparative Example 4 | 0.9 | — | 0.05 | 1 | 5 | — | (Ba$_{0.9}$,Eu$_{0.1}$)O.MgO.5Al$_2$O$_3$ | 1650 |
| Comparative Example 5 | 0.9 | — | 0.05 | 1 | 5 | 1 | (Ba$_{0.9}$,Eu$_{0.1}$)O.MgO.5Al$_2$O$_3$ | 1650 |
| Comparative Example 6 | 0.8 | 0.1 | 0.05 | 1 | 5 | 1 | (Ba$_{0.8}$,Sr$_{0.1}$,Eu$_{0.1}$)O.MgO.5Al$_2$O$_3$ | 1500 |

TABLE 5

|  | Composition | Luminous intensity-maintaining ratio Mx (%) | Lattice constant a (Å) | Lattice constant c (Å) |
|---|---|---|---|---|
| Example 1 | (Ba$_{0.8}$,Eu$_{0.2}$)O.MgO.5Al$_2$O$_3$ | 94.8 | 5.636 | 22.643 |
| Example 2 | (Ba$_{0.7}$,Eu$_{0.3}$)O.MgO.5Al$_2$O$_3$ | — | 5.630 | 22.598 |
| Example 3 | (Ba$_{0.5}$,Eu$_{0.5}$)O.MgO.5Al$_2$O$_3$ | 97.9 | 5.628 | 22.542 |
| Example 4 | (Ba$_{0.8}$,Eu$_{0.2}$)O.MgO.5Al$_2$O$_3$ | 95.4 | — | — |
| Example 5 | (Ba$_{0.5}$,Eu$_{0.5}$)O.MgO.5Al$_2$O$_3$ | 96.7 | — | — |
| Example 6 | (Ba$_{0.8}$,Eu$_{0.2}$)O.MgO.5Al$_2$O$_3$ | 94.0 | — | — |
| Example 7 | (Ba$_{0.5}$,Eu$_{0.5}$)O.MgO.5Al$_2$O$_3$ | 96.6 | — | — |
| Example 8 | (Ba$_{0.7}$,Sr$_{0.2}$,Eu$_{0.1}$)O.MgO.5Al$_2$O$_3$ | 92.0 | — | — |
| Example 9 | (Ba$_{0.5}$,Sr$_{0.4}$,Eu$_{0.1}$)O.MgO.5Al$_2$O$_3$ | 92.7 | 5.629 | 22.540 |
| Comparative Example 1 | (Ba$_{0.99}$,Eu$_{0.01}$)O.MgO.5Al$_2$O$_3$ | 70.4 | 5.636 | 22.686 |
| Comparative Example 2 | (Ba$_{0.95}$,Eu$_{0.05}$)O.MgO.5Al$_2$O$_3$ | 85.0 | — | — |
| Comparative Example 3 | (Ba$_{0.9}$,Eu$_{0.1}$)O.MgO.5Al$_2$O$_3$ | 90.0 | 5.632 | 22.650 |
| Comparative Example 4 | (Ba$_{0.9}$,Eu$_{0.1}$)O.MgO.5Al$_2$O$_3$ | 89.4 | — | — |
| Comparative Example 5 | (Ba$_{0.9}$,Eu$_{0.1}$)O.MgO.5Al$_2$O$_3$ | 89.2 | — | — |
| Comparative Example 6 | (Ba$_{0.8}$,Sr$_{0.1}$,Eu$_{0.1}$)O.MgO.5Al$_2$O$_3$ | 91.5 | — | — |

EXAMPLE 13

BaCO$_3$: 0.9 mol

Eu$_2$O$_3$: 0.05 mol

In(NO$_3$)$_3$.3H$_2$O: 0.0001 mol

3MgCO$_3$.Mg(OH)$_2$: 0.25 mol

Al$_2$O$_3$ (γ-type): 5.0 mol

AlF$_3$: 0.012 mol

The above raw materials were mixed in a wet system, followed by drying and sieving and then filled in a crucible. Further, a crucible containing carbon beads was placed on the raw materials and covered with a lid, followed by primary firing in a nitrogen atmosphere containing steam at a maximum temperature of 1450° C. over a period of 11 hours inclusive of the temperature-raising time. Then, the fired powder was pulverized, sieved and filled again in a crucible. Further, a crucible containing carbon beads was placed thereon and covered with a lid, followed by secondary firing in a nitrogen/hydrogen mixed atmosphere containing steam at a maximum temperature of 1450° C. over a period of 11 hours inclusive of the temperature-raising time. Then, the fired powder was subjected to dispersion, washing, drying and sieving treatments to obtain a bivalent europium-activated blue-emitting barium magnesium aluminate phosphor of (Ba$_{0.9}$,Eu$_{0.1}$)O.MgO.5Al$_2$O$_3$.0.0001T (wherein T is at least one member selected from the group consisting of ½ In$_2$O, InO and ½ In$_2$O$_3$). The baking luminous intensity-maintaining ratio Mb of this phosphor was 81.0%.

EXAMPLE 14

BaCO$_3$: 0.9 mol

Eu$_2$O$_3$: 0.05 mol

In(NO$_3$)$_3$.3H$_2$O: 0.001 mol

3MgCO$_3$.Mg(OH)$_2$: 0.25 mol

Al$_2$O$_3$ (γ-type): 5.0 mol

AlF$_3$: 0.012 mol

The above raw materials were subjected to the same treatment as in Example 13 to obtain a bivalent europium-activated blue-emitting barium magnesium aluminate phosphor of (Ba$_{0.9}$,Eu$_{0.1}$)O.MgO.5Al$_2$O$_3$.0.001T (wherein T is at least one member selected from the group consisting of ½ In$_2$O, InO and ½ In$_2$O$_3$). The baking luminous intensity-maintaining ratio Mb of this phosphor was 76.9%.

BaCO$_3$: 0.9 mol

Eu$_2$O$_3$: 0.05 mol

3MgCO$_3$.Mg(OH)$_2$: 0.25 mol

Al$_2$O$_3$ ($\gamma$-type): 5.0 mol

AlF$_3$: 0.012 mol

The above raw materials were subjected to the same treatment as in Example 13 to obtain a bivalent europium-activated blue-emitting barium magnesium aluminate phosphor of (Ba$_{0.9}$,Eu$_{0.1}$)O.MgO.5Al$_2$O$_3$. The baking luminous intensity-maintaining ratio of Mb of this phosphor was 74.5%.

Examples 13 and 14 are the same except for the content of In, whereby improvement in the baking luminous intensity-maintaining ratio was observed by the incorporation of In.

EXAMPLE 15

BaCO$_3$: 0.8 mol

Eu$_2$O$_3$: 0.1 mol

In(NO$_3$)$_3$.3H$_2$O: 0.0001 mol

3MgCO$_3$.Mg(OH)$_2$: 0.25 mol

Al$_2$O$_3$ ($\alpha$-type): 5.0 mol

AlF$_3$: 0.010 mol

The above raw materials were mixed in a wet system, followed by drying and sieving and then filled in a crucible. Further, graphite blocks were placed on the raw materials and covered with a lid, followed by firing in a nitrogen/hydrogen atmosphere containing steam at a maximum temperature of 1450° C. over a period of 11 hours inclusive of the temperature-raising time. Then, the fired powder was subjected to dispersion, washing, drying and sieving treatments to obtain a bivalent europium-activated blue-emitting barium magnesium aluminate phosphor of (Ba$_{0.8}$,Eu$_{0.2}$)O.MgO.5Al$_2$O$_3$.0.0001T (wherein T is at least one member selected from the group consisting of ½ In$_2$O, InO and ½ In$_2$O$_3$). The baking luminous intensity-maintaining ratio Mb of this phosphor was 81.0%.

EXAMPLE 16

BaCO$_3$: 0.8 mol

Eu$_2$O$_3$: 0.1 mol

In(NO$_3$)$_3$.3H$_2$O: 0.01 mol

3MgCO$_3$.Mg(OH)$_2$: 0.25 mol

Al$_2$O$_3$ ($\alpha$-type): 5.0 mol

AlF$_3$: 0.010 mol

The above raw materials were subjected to the same treatment as in Example 15 to obtain a bivalent europium-activated blue-emitting barium magnesium aluminate phosphor of (Ba$_{0.8}$,Eu$_{0.2}$)O.MgO.5Al$_2$O$_3$.0.01T (wherein T is at least one member selected from the group consisting of ½ In$_2$O, InO and ½ In$_2$O$_3$). The baking luminous intensity-maintaining ratio Mb of this phosphor was 82.6%.

BaCO$_3$: 0.8 mol

Eu$_2$O$_3$: 0.1 mol

3MgCO$_3$.Mg(OH)$_2$: 0.25 mol

Al$_2$O$_3$ ($\alpha$-type): 5.0 mol

AlF$_3$: 0.010 mol

The above raw materials were subjected to the same treatment as in Example 15 to obtain a bivalent europium-activated blue-emitting barium magnesium aluminate phosphor of (Ba$_{0.8}$,Eu$_{0.2}$)O.MgO.5Al$_2$O$_3$. The baking luminous intensity-maintaining ratio Mb of this phosphor was 74.8%.

Examples 15 and 16 were the same except for the content of In, whereby improvement of the baking luminous intensity-maintaining ratio was observed by the incorporation of In.

EXAMPLE 17

BaCO$_3$: 0.799 mol

Eu$_2$O$_3$: 0.1 mol

Sm$_2$O$_3$: 0.0005 mol

3MgCO$_3$.Mg(OH)$_2$: 0.25 mol

Al$_2$O$_3$ ($\alpha$-type): 5.0 mol

AlF$_3$: 0.010 mol

The above raw materials were mixed in a wet system, followed by drying and sieving and then filled in a crucible. Further, a crucible containing carbon beads was placed on the raw materials and covered with a lid, followed by firing in a nitrogen atmosphere containing steam at a maximum temperature of 1450° C. over a period of 11 hours inclusive of the temperature-raising time. Then, the fired powder was subjected to dispersion, washing, drying and sieving treatments to obtain a bivalent europium-activated blue-emitting barium magnesium aluminate phosphor of (Ba$_{0.799}$,Eu$_{0.2}$Sm$_{0.001}$)O.MgO.5Al$_2$O$_3$. The baking luminous intensity-maintaining ratio Mb of this phosphor was 76.5%.

EXAMPLE 18

BaCO$_3$: 0.79 mol

Eu$_2$O$_3$: 0.1 mol

Sm$_2$O$_3$: 0.005 mol

3MgCO$_3$.Mg(OH)$_2$: 0.25 mol

Al$_2$O$_3$ ($\alpha$-type): 5.0 mol

AlF$_3$: 0.010 mol

The above raw materials were subjected to the same treatment as in Example 17 to obtain a bivalent europium-activated blue-emitting barium magnesium aluminate phosphor of (Ba$_{0.79}$,Eu$_{0.2}$Sm$_{0.01}$)O.MgO.5Al$_2$O$_3$. The baking luminous intensity-maintaining ratio Mb of this phosphor was 80.0%.

EXAMPLE 19

BaCO$_3$: 0.799 mol

Eu$_2$O$_3$: 0.1 mol

Tm$_2$O$_3$: 0.0005 mol

3MgCO$_3$.Mg(OH)$_2$: 0.25 mol

Al$_2$O$_3$ ($\alpha$-type): 5.0 mol

AlF$_3$: 0.010 mol

The above raw materials were subjected to the same treatment as in Example 17 to obtain a bivalent europium-activated blue-emitting barium magnesium aluminate phosphor of (Ba$_{0.799}$,Eu$_{0.2}$Tm$_{0.001}$)O.MgO.5Al$_2$O$_3$. The baking luminous intensity-maintaining ratio Mb of this phosphor was 83.9%.

EXAMPLE 20

BaCO$_3$: 0.79 mol

Eu$_2$O$_3$: 0.1 mol

Tm$_2$O$_3$: 0.005 mol

3MgCO$_3$.Mg(OH)$_2$:0.25 mol

Al$_2$O$_3$ ($\alpha$-type): 5.0 mol

AlF$_3$: 0.010 mol

The above raw materials were subjected to the same treatment as in Example 17 to obtain a bivalent europium-activated blue-emitting barium magnesium aluminate phosphor of (Ba$_{0.79}$,Eu$_{0.2}$Tm$_{0.01}$)O.MgO.5Al$_2$O$_3$. The baking luminous intensity-maintaining ratio Mb of this phosphor was 89.1%.

EXAMPLE 21

$BaCO_3$: 0.79 mol $Eu_2O_3$: 0.1 mol $Yb_2O_3$: 0.005 mol $3MgCO_3.Mg(OH)_2$: 0.25 mol $Al_2O_3$ ($\alpha$-type): 5.0 mol $AlF_3$: 0.010 mol The above raw materials were subjected to the same treatment as in Example 17 to obtain a bivalent europium-activated blue-emitting barium magnesium aluminate phosphor of $(Ba_{0.79},Eu_{0.2}Yb_{0.01})O.MgO.5Al_2O_3$. The baking luminous intensity-maintaining ratio Mb of this phosphor was 82.2%.

$BaCO_3$: 0.8 mol $Eu_2O_3$: 0.1 mol $3MgCO_3.Mg(OH)_2$: 0.25 mol $Al_2O_3$ ($\alpha$-type): 5.0 mol $AlF_3$: 0.010 mol The above raw materials were subjected to the same treatment as in Example 17 to obtain a bivalent europium-activated blue-emitting barium magnesium aluminate phosphor of $(Ba_{0.8},Eu_{0.2})O.MgO.5Al_2O_3$. The baking luminous intensity-maintaining ratio Mb of this phosphor was 74.8%.

Examples 17, 18, 19, 20 and 21 are the same except for the content of Ln (wherein Ln is at least one element selected from the group consisting of Sm, Tm and Yb), whereby improvement of the baking luminous intensity-maintaining ratio is observed by the incorporation of Ln.

EXAMPLE 22

$BaCO_3$: 0.895 mol $Eu_2O_3$: 0.05 mol $Tm_2O_3$: 0.0025

$3MgCO_3.Mg(OH)_2$: 0.25 mol $Al_2O_3$ ($\alpha$-type): 5.0 mol $AlF_3$: 0.012 mol The above raw materials were mixed in a wet system, followed by drying and sieving and then filled in a crucible. Further, a crucible containing carbon beads was placed on the raw materials and covered with a lid, followed by primary firing in a nitrogen atmosphere containing steam at a maximum temperature of 1450° C. over a period of 11 hours inclusive of the temperature-raising time. Then, the fired powder was pulverized, sieved and filled again in a crucible. Further, a crucible containing carbon beads was placed thereon and covered with a lid, followed by secondary firing in a nitrogen/hydrogen mixed atmosphere containing steam at a maximum temperature of 1450° C. over a period of 11 hours inclusive of the temperature-raising time. Then, the fired powder was subjected to dispersion, washing, drying and sieving treatments to obtain a bivalent europium-activated blue-emitting barium magnesium aluminate phosphor of $(Ba_{0.895},Eu_{0.1}Tm_{0.005})O.MgO.5Al_2O_3$. The baking luminous intensity-maintaining ratio Mb of this phosphor was 76.8%.

EXAMPLE 23

$BaCO_3$: 0.895 mol $Eu_2O_3$: 0.05 mol $Yb_2O_3$: 0.0025 mol $3MgCO_3.Mg(OH)_2$: 0.25 mol $Al_2O_3$ ($\gamma$-type): 5.0 mol $AlF_3$: 0.012 mol The above raw materials were subjected to the same treatment as in Example 22 to obtain a bivalent europium-activated blue-emitting barium magnesium aluminate phosphor of $(Ba_{0.895},Eu_{0.1}Yb_{0.005})O.MgO.5Al_2O_3$. The baking luminous intensity-maintaining ratio Mb of this phosphor was 77.7%.

$BaCO_3$: 0.9 mol $Eu_2O_3$: 0.05 mol $3MgCO_3.Mg(OH)_2$: 0.25 mol $Al_2O_3$ ($\gamma$-type): 5.0 mol $AlF_3$: 0.012 mol The above raw materials were subjected to the same treatment as in Example 22 to obtain a bivalent europium-activated blue-emitting barium magnesium aluminate phosphor of $(Ba_{0.9},Eu_{0.1})O.MgO.5Al_2O_3$. The baking luminous intensity-maintaining ratio Mb of this phosphor was 74.5%.

Examples 22 and 23 are the same except for the content of Ln (Ln is at least one element selected from the group consisting of Sm, Tm and Yb), whereby improvement of the baking luminous intensity-maintaining ratio was observed by the incorporation of Ln.

EXAMPLE 24 and COMPARATIVE EXAMPLE 7

Aluminate phosphors were prepared in the same manner as in Example 1 except that the compositions of the raw material mixtures were changed as shown in Table 6 and that the firing temperatures were changed for 1450° C.

The powder X-ray diffraction pattern in Example 24 had no diffraction peak at Miller index 008 which are independent of the diffraction peak at Miller index 110. On the other hand, the pattern in Comparative Example 7 had an independent diffraction peak at Miller index 008.

EXAMPLES 25 and 26

Aluminate phosphors were prepared in the same manner as in Example 17 except that the compositions of the raw material mixtures were changed as shown in Table 6. Improvement of the baking luminous intensity-maintaining ratio was observed by the incorporation of Ln.

TABLE 6

| | $BaCO_3$ mol | $SrCO_3$ mol | $Eu_2O_3$ mol | MgO mol | $MnO_2$ mol | $Al_2O_3$ mol | $AlF_3$ mol | Others mol | Composition | Mx (%) or Mb (%) |
|---|---|---|---|---|---|---|---|---|---|---|
| Example 24 | 0.8 | — | 0.1 | 0.98 | 0.02 | 5 | 0.01 | — | $(Ba_{0.8}Eu_{0.2})O.(Mg_{0.98}Mn_{0.02})O.5Al_2O_3$ | Mx = 94.4 |
| Comparative Example 7 | 0.9 | — | 0.05 | 0.98 | 0.02 | 5 | 0.01 | — | $(Ba_{0.9}Eu_{0.1})O.(Mg_{0.98}Mn_{0.02})O.5Al_2O_3$ | Mx = 88.5 |
| Example 25 | 0.79 | — | 0.1 | 0.98 | 0.02 | 5 | 0.01 | $Sm_2O_3$ | $(Ba_{0.79}Eu_{0.2}Sm_{0.01})O.(Mg_{0.98}Mn_{0.02})O.$ | Mb = 75.3 |

TABLE 6-continued

| | BaCO$_3$ mol | SrCO$_3$ mol | Eu$_2$O$_3$ mol | MgO mol | MnO$_2$ mol | Al$_2$O$_3$ mol | AlF$_3$ mol | Others mol | Composition | Mx (%) or Mb (%) |
|---|---|---|---|---|---|---|---|---|---|---|
| | 0.8 | — | 0.1 | 0.98 | 0.02 | 5 | 0.01 | 0.005 5Al$_2$O$_3$ — | (Ba$_{0.8}$Eu$_{0.2}$)O.(Mg$_{0.98}$Mn$_{0.02}$)O.5Al$_2$O$_3$ | Mb = 70.5 |
| Example 26 | 0.59 | 0.3 | 0.1 | 0.98 | 0.02 | 5 | 0.01 | Tm$_2$O$_3$ 0.005 | (Ba$_{0.59}$Sr$_{0.3}$Eu$_{0.1}$Tm$_{0.01}$)O. (Mg$_{0.98}$Mn$_{0.02}$)O.5Al$_2$O$_3$ | Mb = 84.3 |
| | 0.6 | 0.3 | 0.05 | 0.98 | 0.02 | 5 | 0.01 | — | (Ba$_{0.6}$Sr$_{0.3}$Eu$_{0.1}$)O.(Mg$_{0.98}$Mn$_{0.02}$)O. 5Al$_2$O$_3$ | Mb = 82.0 |

In each Example, no precipitation of impurities was observed, and a phosphor of a crystalline inorganic compound having substantially the same composition as the composition of the raw material mixture, was obtained.

What is claimed is:

1. An aluminate phosphor comprising (a) at least one element selected from the group consisting of Ba, Sr and Ca, (b) Eu, (c) Mg or Mg and Zn, (d) optionally Mn and (e) Al, said aluminate phosphor comprising a crystalline inorganic compound which shows, in its powder X-ray diffraction pattern upon incidence of X-rays of CuK$\alpha_1$, no medium value at Miller index 008 independent of a diffraction peak at Miller index 110.

2. The aluminate phosphor according to claim 1, wherein said crystalline inorganic compound is represented by the formula:

(M$^1_{1-x}$Eu$_x$)O.a(M$^2_{1-y}$Mn$_y$)O.(5.5–0.5a)Al$_2$O$_3$ wherein M$^1$ is at least one element selected from the group consisting of Ba, Sr and Ca, M$^2$ is Mg and/or Zn, a is a real number of 0<a≦2, and x and y are real numbers of 0<x<1 and 0≦y<1, respectively.

3. The aluminate phosphor according to claim 2, wherein x and y are real numbers of 0.1≦x≦0.5 and 0≦y≦0.2, respectively.

4. The aluminate phosphor according to claim 2, wherein a is a real number of 1≦a≦2.

5. The aluminate phosphor according to claim 3, wherein when x is 0.1≦x≦0.15, ratios of elements constituting M$^1$ satisfy 0.2≦Sr/(Ba+Sr+Ca+Eu)<1.

6. The aluminate phosphor according to claim 2, wherein y=0.

7. The aluminate phosphor according to claim 1, which consists essentially of a single phase of said crystalline inorganic compound.

8. The aluminate phosphor according to claim 1, wherein a luminous intensity-maintaining ratio of said aluminate phosphor in the X-ray irradiation test is at least 92%.

9. An aluminate phosphor comprising a crystalline inorganic compound of the formula:

(M$^1_{1-x}$Eu$_x$)O.a(M$^2_{1-y}$Mn$_y$)O.(5.5–0.5a)Al$_2$O$_3$ wherein M$^1$ is at least one element selected from the group consisting of Ba, Sr and Ca, M$^2$ is Mg or Mg and Zn, a, x and y are real numbers of 1≦a≦2, 0.1≦x≦0.5 and 0≦y≦0.2, respectively, provided that when 0.1≦x≦0.15, ratios of elements constituting M$^1$ satisfy 0.2≦Sr/(Ba+Sr+Ca+Eu)<1.

10. An aluminate phosphor comprising (a) at least one element selected from the group consisting of Ba, Sr and Ca, (b) Eu, (c) In, (d) Mg and/or Zn, (e) Al, and (f) optionally Mn.

11. The aluminate phosphor according to claim 10, wherein the aluminate phosphor is represented by the formula:

a'(M'$^1_{1-x'}$Eu$_{x'}$)O.b'(M'$^2_{1-y'}$Mn$_{y'}$)O.c'Al$_2$O$_3$.d'T wherein M'$^1$ is at least one element selected from the group consisting of Ba, Sr and Ca, M'$^2$ is Mg and/or Zn, T is at least one indium compound selected from the group consisting of ½ In$_2$O, InO and ½ In$_2$O$_3$, and a', b', c', d', x' and y' are real numbers of 0.9≦a'≦1, 0.9≦b'≦2, 4.5≦c'≦5.1, d'>0, 0<x'<1 and 0≦y'<1, respectively.

12. The aluminate phosphor according to claim 11, wherein x' and y' are real numbers of 0.05≦x'≦0.5 and 0≦y'≦0.2, respectively.

13. The aluminate phosphor according to claim 11, wherein d' is real number of 0<d'<0.1.

14. The aluminate phosphor according to claim 10, which is a crystalline inorganic compound which shows, in its powder X-ray diffraction pattern upon incidence of X-rays of CuK$\alpha_1$, no maximum value at Miller index 008 independent of a diffraction peak at Miller index 110.

15. An aluminate phosphor represented by the formula:

(M''$^1_{1-x''-y''}$Eu$_{x''}$Ln$_{y''}$)O.a''(M''$^2_{1-z''}$Mn$_{z''}$)O.b''Al$_2$O$_3$ wherein M''$^1$ is at least one element selected from the group consisting of Ba, Sr and Ca, M''$^2$ is Mg and/or Zn, Ln is at least one element selected from the group consisting of Sm, Tm and Yb, and a'', b'', x'', y'' and are real numbers of 1≦a''≦2, 4.5≦b''≦5, 0<x''<1, 0<y''<1 and 0≦z''<1, respectively, provided that x''+y''<1.

16. The aluminate phosphor according to claim 15, wherein x'', y'' and z'' are real numbers of 0.05≦x''≦0.5, 0<y''<0.1 and 0≦z''≦0.2, respectively.

17. The aluminate phosphor according to claim 15, which is a crystalline inorganic compound which shows, in its powder X-ray diffraction pattern upon incidence of X-rays of CuK$\alpha_1$, no maxiumum value at Miller index 008 independent of a diffraction peak at Miller index 110.

18. An aluminate phosphor comprising a crystalline inorganic compound of the formula:

(M$^1_{1-x}$Eu$_x$)O.a(M$^2_{1-y}$Mn$_y$)O.(5.5–0.5a)Al$_2$O$_3$ wherein M$^1$ is at least one element selected from the group consisting of Ba, Sr and Ca, M$^2$ is Mg or Mg and Zn, a is a real number of 0<a≦2, x and y are real numbers of 0.1≦x≦0.5 and 0≦y≦0.2, respectively, and when x is 0.1<x<0.15, the ratio of elements constituting M$^1$ satisfies the relationship:

02≦Sr/(Ba+Sr+Ca+Eu)<1.

* * * * *

UNITED STATES PATENT AND TRADEMARK OFFICE
CERTIFICATE OF CORRECTION

PATENT NO. : 5,611,959
DATED : March 18, 1997
INVENTOR(S) : Naoto Kijima, et al.

It is certified that error appears in the above-identified patent and that said Letters Patent is hereby corrected as shown below:

Column 21, line 24, "no medium" should read
--no maximum--.

Column 22, line 42, "a", b", x", y" and are real" should read
--a", b", x", y" and z" are real--;
    line 51, "no maxiumum" should read
--no maximum--;
    line 62, "0.1<X<0.15" should read
--$0.1 \leq X \leq 0.15$--;
    line 64, "02$\leq$Sr/(Ba+Sr+Ca+Eu)<1." should read
--$0.2 \leq$Sr/(Ba+Sr+Ca+Eu)<1.--

Signed and Sealed this

Sixteenth Day of December, 1997

*Attest:*

BRUCE LEHMAN

*Attesting Officer*    *Commissioner of Patents and Trademarks*